United States Patent
Yamamoto

(10) Patent No.: US 8,454,250 B2
(45) Date of Patent: Jun. 4, 2013

(54) LENS DEVICE

(75) Inventor: Shigeru Yamamoto, Saitama (JP)

(73) Assignee: Fujifilm Corporation, Tokyo (JP)

( * ) Notice: Subject to any disclaimer, the term of this patent is extended or adjusted under 35 U.S.C. 154(b) by 85 days.

(21) Appl. No.: 13/231,477

(22) Filed: Sep. 13, 2011

(65) Prior Publication Data
US 2012/0063764 A1 Mar. 15, 2012

(30) Foreign Application Priority Data
Sep. 14, 2010 (JP) .................................. 2010-206106

(51) Int. Cl.
*G03B 17/00* (2006.01)
(52) U.S. Cl.
USPC .......................................... 396/531; 359/827
(58) Field of Classification Search
USPC .................................... 396/530, 531; 359/827
See application file for complete search history.

(56) References Cited

U.S. PATENT DOCUMENTS

| | | |
|---|---|---|
| 4,594,613 A | 6/1986 | Shinbori et al. |
| 6,154,255 A | 11/2000 | Shishido et al. |
| 2006/0216023 A1* | 9/2006 | Tokiwa et al. ................. 396/532 |
| 2009/0067831 A1* | 3/2009 | Hwang ........................... 396/532 |
| 2009/0109558 A1* | 4/2009 | Schaefer ........................ 359/827 |

FOREIGN PATENT DOCUMENTS

| | | |
|---|---|---|
| GB | 1290233 | 9/1972 |
| JP | 10-115757 | 5/1998 |
| WO | 92/19069 | 10/1992 |

OTHER PUBLICATIONS

Extended European Search Report issued Dec. 15, 2011 by the European Patent Office in corresponding European Patent Application No. 11180917.4, 4 pages.

* cited by examiner

*Primary Examiner* — Clayton E LaBalle
*Assistant Examiner* — Fang-Chi Chang
(74) *Attorney, Agent, or Firm* — Young & Thompson

(57) ABSTRACT

A camera-attached lens device includes a lens barrel, a mount ring, pins, through holes, a positioning ring, and a fixing member. The lens barrel holds a lens system. The mount ring, attached to the lens barrel, has a tubular fitted portion coupling with the camera and a flange portion around the fitted portion. The pins are on the lens barrel and position a central axis of the mount ring with respect to an optical axis. The through holes are on the flange portion. The positioning ring outer diameter is smaller than a hole diameter of the through holes and has an opening where the pins are fitted. The fixing member fixes the positioning ring inside the through holes. The pins are restricted by the opening of the positioning ring fixed by the fixing member when the mount ring is positioned, positioning the lens barrel with respect to the mount ring.

5 Claims, 3 Drawing Sheets

US 8,454,250 B2

LENS DEVICE

CROSS-REFERENCE TO RELATED APPLICATIONS

This application claims the benefit of Japanese Patent Application No. 2010-206106 (filed on Sep. 14, 2010), the entire contents of which are hereby incorporated by reference.

BACKGROUND

1. Technical Field

The present invention relates to a lens device interchangeably mounted on a camera body of a cine-camera for motion picture filming or the like.

2. Related Art

Cameras such as cine-cameras are provided with: a lens device having a lens barrel holding a lens system; and a camera body on which the lens device is detachably mounted. In some lens devices, for attachment to the camera body, a bayonet mount ring serving as a connection with the camera body is attached to the lens barrel. In the manufacture of the lens device, when the mount ring is attached to the lens barrel, it is necessary to make an adjustment so that the optical axis of the lens system of the lens barrel and the central axis of the mount ring coincide with each other.

A method is available in which a fixing pin is provided to the lens barrel, a pin hole is provided to the mount ring and the fixing pin is inserted in the pin hole in a position where the optical axis of the lens barrel and the central axis of the mount ring coincide with each other, thereby positioning the lens barrel and the mount ring with respect to each other. However, this method requires that the fixing pin and the pin hole be formed with a high degree of processing accuracy.

An example of a technology where the alignment between the mount ring and the lens barrel can be adjusted after the mount ring is attached to the lens barrel is the one shown in JP-10-115757. JP-10-115757 describes a mount shift device that is provided with a mount frame mounted on the camera body and a lens frame supporting a lens unit and adjusts the position of the lens frame in a direction orthogonal to the optical axis with respect to the mount frame.

When the camera body is replaced according to the purpose for image taking or the like, there are cases where it is necessary to replace the mount ring attached to the lens barrel of the lens device according to the kind of the camera body. For example, in digital cameras, since a cover glass for preventing the adhesion of water drops and dust is incorporated, a mount ring not provided with a cover glass is attached to the lens barrel. On the other hand, in film cameras, since no cover glass is incorporated in the camera body, a mount ring provided with a cover glass is attached to the lens barrel.

The device of JP-10-115757 is not intended for detaching the mount frame from the lens barrel or attaching another mount frame to the lens barrel. When the mount ring of the lens barrel is replaced in cases such as when the camera body is replaced, it is necessary to re-perform the alignment between the optical axis of the lens barrel and the central axis of the mount ring, which makes the work cumbersome.

SUMMARY OF INVENTION

The present invention provides a lens device where when another mount ring is attached to the lens barrel, it is unnecessary to re-perform the alignment between the optical axis of the lens held by the lens barrel and the central axis of the mount ring.

According to an aspect of the invention, a lens device attached to a camera includes a lens barrel, a mount ring, a plurality of pins, a plurality of through holes, a positioning ring, and a fixing member. The lens barrel holds a lens system. The mount ring has a tubular fitted portion which establishes coupling with the camera and a flange portion which is provided around the fitted portion. The mount ring is attached to the lens barrel. The plurality of pins is provided on the lens barrel and positions a central axis of the mount ring with respect to an optical axis of the lens system. The plurality of through holes is formed on the flange portion. The positioning ring has an outer diameter smaller than a hole diameter of the through holes and provided with an opening where the pins are fitted. The fixing member fixes the positioning ring inside the through holes. The pins are restricted by the opening of the positioning ring fixed by the fixing member under a condition where the mount ring is positioned, in order to position the lens barrel and the mount ring with respect to each other.

According to the present invention, a lens device can be provided where when another mount ring is attached to the lens barrel, it is unnecessary to re-perform the alignment between the optical axis of the lens held by the lens barrel and the central axis of the mount ring.

DETAILED DESCRIPTION

Figure 1:
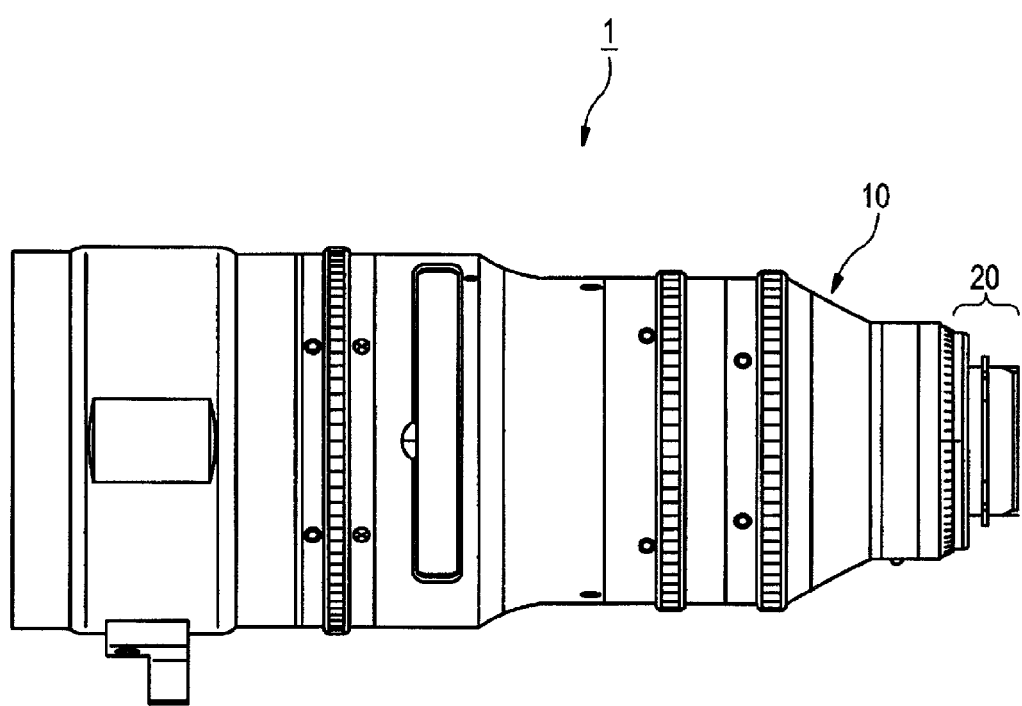
FIG. 1 is a side view showing the appearance of the whole of a lens device.

FIG. 1 is a side view showing the appearance of the whole of a lens device. The lens device 1 shown in FIG. 1 has, as an example, a structure of a cine lens attachable to the camera body of a camera for cinemas.

The lens device 1 is provided with: a lens barrel 10 holding a lens system; and a mount ring 20 for mounting the lens device 1 on the camera body (not shown). In the description given below, with respect to the direction of the optical axis of the lens barrel 10, the light incident side will be referred to as a front end side, and the light exit side (camera body side), as a rear end side. The mount ring 20 has a bayonet structure attached to the rear end portion of the lens barrel 10. The lens device 1 is attachable to the non-illustrated camera body by the mount ring 20.

The lens barrel 10 is provided with a lens system. As the lens system, inside the lens barrel 10, a stationary focusing lens, a movable focusing lens, a zoom lens, an iris, a relay lens and the like are arranged in this order from the front end side, and these lenses are held inside the lens barrel 10 so that the optical axes thereof coincide with one another.

Figure 2:
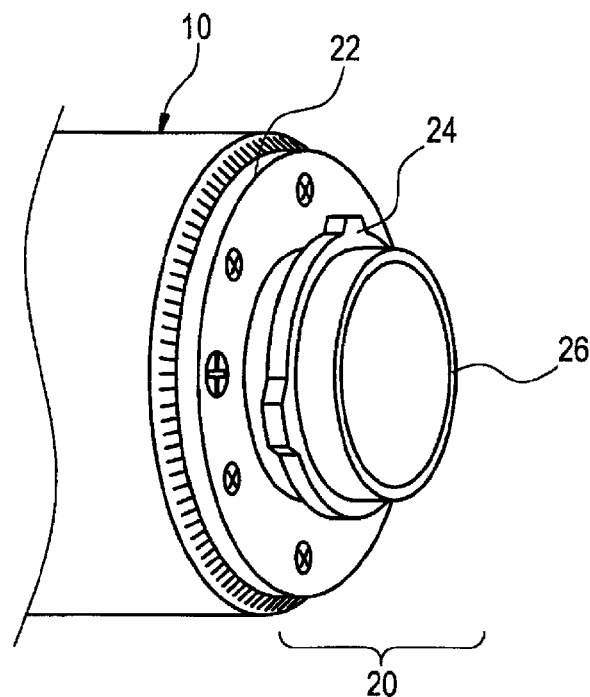
FIG. 2 is a perspective view showing one end of the lens device.

FIG. 2 is a perspective view showing the mount ring of the lens device.

The mount ring 20 is a member having a shape rotationally symmetric with respect to the central axis. The mount ring 20 is provided with: a tubular fitted portion 26 fitted in the camera body; a bayonet claw portion 24 protruding outward from the outer periphery of the fitted portion 26; and a flange portion 22 formed in an annular plate form on an end portion opposite to the fitting side in the axial direction of the fitted portion 26.

Figure 3:
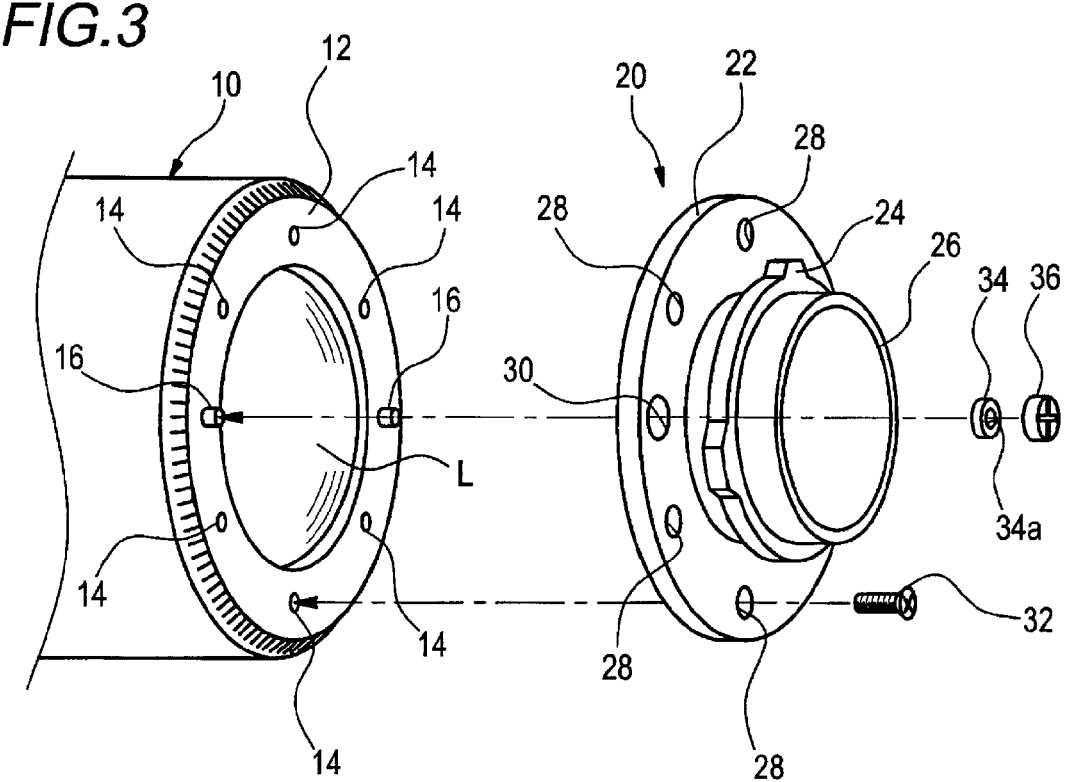
FIG. 3 is a perspective view showing a condition before a mount ring is attached to a lens barrel.
Figure 4:
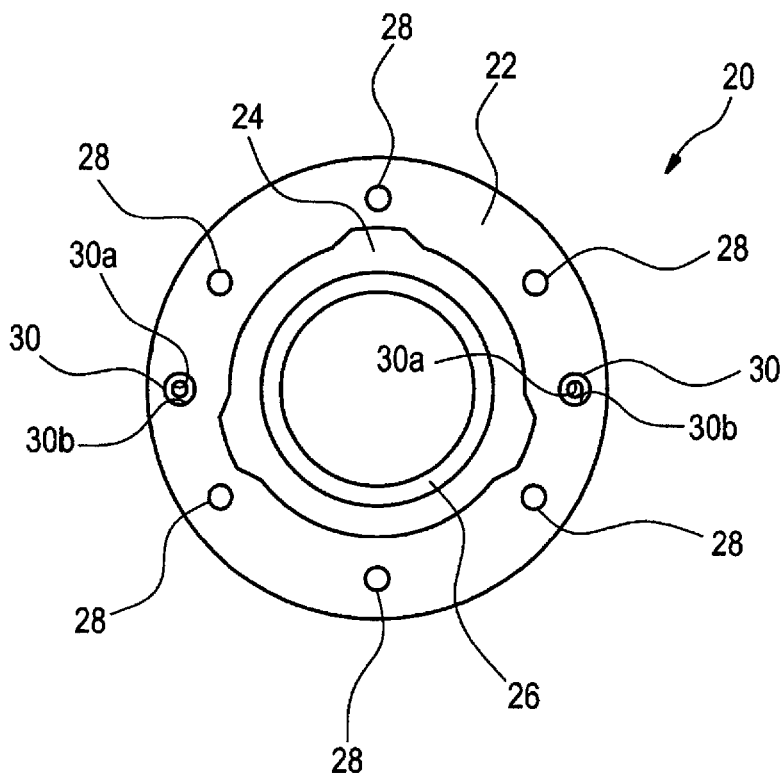
FIG. 4 is a plan view of the mount ring.

FIG. 3 is a perspective view showing a condition before the mount ring is attached to the lens barrel. FIG. 4 is a plan view of the mount ring. FIG. 4 shows a condition where the mount ring shown in FIG. 3 is viewed in the axial direction of the central axis.

On the rear end of the lens barrel 10, an attachment surface 12 for attaching the mount ring 20 is provided. The attachment surface 12 is annular when viewed in the direction of the optical axis. The lens surface of the lens disposed on the rearmost side in the lens system is exposed in the central part of the attachment surface.

The attachment surface 12 is provided with six screw holes 14 and two cylindrical pins 16 protruding vertically to the attachment surface 12.

The two pins 16 are disposed in positions axially symmetric with respect to the central axis of the lens barrel 10. The number of pins 16 is not limited to two as long as it is more than one, and may be three or more. However, disposing the two pins 16 in positions axially symmetric with respect to the central axis of the lens barrel 10 facilitates the later-described alignment between the lens barrel 10 and the mount ring 20.

As shown in FIG. 4, on the flange portion 22 of the mount ring 20, six screw holes 28 and two through holes 30 are formed. The two through holes 30 are disposed in positions axially symmetric with respect to the central axis of the mount ring 20. Through holes 30 as many as the pins 16 are formed on the flange portion 22. Moreover, the through holes 30 are provided in positions, on the flange portion 22, corresponding to the positions of the pins 16 provided on the attachment surface 12 of the lens barrel 10 under a condition where the mount ring 20 is attached to the attachment surface 12.

The two through holes 30 each have a small diameter portion 30a opened toward the lens barrel 10 on the flange portion 22 and a large diameter portion 30b continuous with the small diameter portion 30a and having a hole diameter larger than that of the small diameter portion 30a. On the inner periphery of each of the through holes 30, a step is provided between the small diameter portion 30a and the large diameter portion 30b. Moreover, a screw groove is formed on the inner periphery of the large diameter portion 30b.

As shown in FIG. 3, a screw 32 is inserted into the screw hole 28 of the flange portion 22, and the end of the screw 32 protruding out of the screw hole 28 is screwed into the screw hole 14 of the attachment surface 12. In this way, the flange portion 22 of the mount ring 20 is fixed to the lens barrel 10.

The pin 16 is fixed by a positioning ring 34 and a fixing screw 36. The positioning ring 34 has an outer diameter smaller than the hole diameter of the large diameter portion 30b of the through hole 30. The positioning ring 34 is provided with an opening 34a in which the pin 16 is fitted. The opening diameter of the opening 34a of the positioning ring 34 is smaller than the hole diameter of the small diameter portion 30a of the through hole 30 and substantially coincides with the outer diameter of the pin 16. That is, the hole diameter of the small diameter portion 30a is larger than the outer diameter of the pin 16.

The fixing screw 36 has a substantially cylindrical shape having an outer diameter substantially equal to the hole diameter of the large diameter portion 30b of the through hole 30, and a screw groove is formed on the peripheral surface thereof. On the inner periphery of the large diameter portion 30b of the fixing screw 36, a groove to be engaged with the screw groove of the fixing screw 36 is formed.

Figure 5:
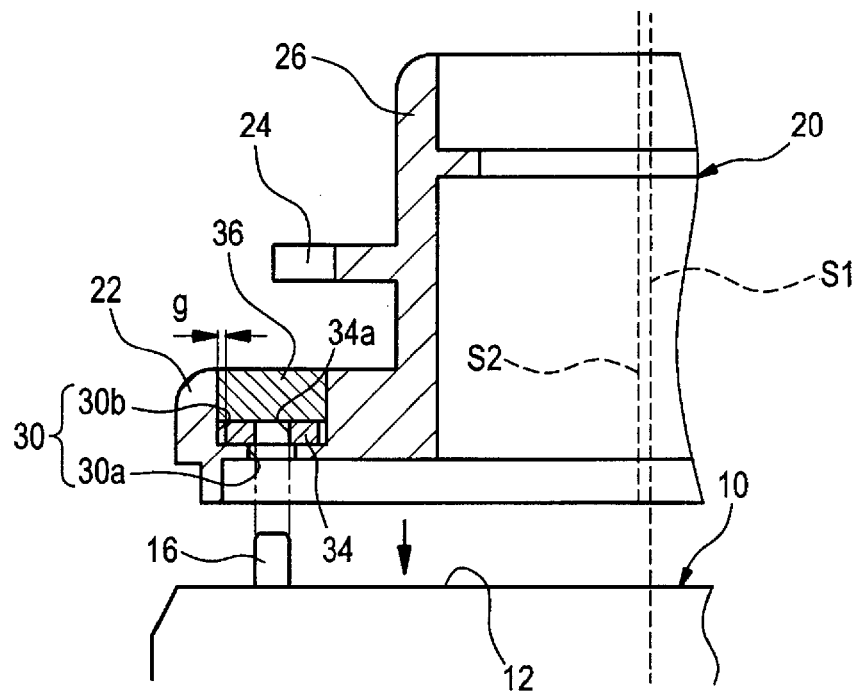
FIG. 5 is a cross-sectional view showing a condition where the mount ring is attached to the lens barrel.

FIG. 5 is a cross-sectional view showing a mechanism that performs the alignment between the lens barrel and the mount ring. The procedure of the alignment will be described based on FIG. 5. In FIG. 5, the structure of only one of the two through holes 30 of the lens device shown in FIG. 1 is shown. The structure of the other through hole 30 is the same and is omitted without illustrated in the figure.

The pin 16 is inserted into the through hole 30 to be fitted in the opening 34a of the positioning ring 34 previously disposed in the through hole 30. The positioning ring 34 is fixed by being fastened by the fixing screw 36 inside the through hole 30.

First, the positioning ring 34 is inserted into the through hole 30 and held at the step between the small diameter portion 30a and the large diameter portion 30b. The fixing screw 36 is fastened to the large diameter portion 30b of the through hole 30 to an extent that the positioning ring 34 is not fastened. There is a gap between the positioning ring 34 and the large diameter portion 30b of the through hole 30, so that the positioning ring 34 is movable in the radial direction of the large diameter portion 30b. Then, the pin 16 provided on the attachment surface 12 of the lens barrel 10 is fitted into the opening 34a of the positioning ring 34.

Then, the optical axis S1 of the lens barrel 10 and the central axis S2 of the mount ring 20 are aligned with each other. As a method of the alignment, light is emitted from a light source through a chart and collimated into a parallel luminous flux by a collimator, and the parallel light is applied to the lens device to be observed. Moreover, a microscope is disposed on the optical axis of the lens device, and the position of the mount ring 20 is adjusted while the image of the chart formed in the position of observation is observed with the microscope.

Since the gap g is provided between the positioning ring 34 and the through hole 30, the position of attachment of the mount ring to the attachment surface 12 of the lens barrel 10 can be changed by moving the positioning ring 34 as appropriate in the through hole 30 according to the amount of shift between the optical axis S1 and the central axis S2.

After the alignment between the optical axis S1 and the central axis S2 is completed, the positioning ring 34 is fixed by being fastened by the fixing screw 36. To fasten the fixing screw 36, a torque driver or the like is used. The shape and kind of the fixing screw 36 may be changed as appropriate within the bounds where the positioning ring 34 can be fixed to the through hole 30.

Once the positioning ring 34 is fixed by the fixing screw 36, the movement thereof in the through hole 30 is avoided, and consequently, the opening 34a of the positioning ring 34 is positioned with respect to the flange portion 22 of the mount ring 20. For this reason, even if the screw 32 is loosened and the mount ring 20 is detached from the lens barrel 10, the positioning ring 34 remains fixed by the fixing screw 36. When the mount ring 20 is attached to the lens barrel 10 again, positioning can be performed by fitting the pin 16 of the lens barrel 10 into the opening 34a of the already fixed positioning ring 34. Therefore, with this lens device 1, when another mount ring 20 is attached to the lens barrel 10, it is unnecessary to re-perform the alignment between the optical axis S1 of the lens held by the lens barrel 10 and the central axis S2 of the mount ring 20.

Since the lens device 1 has a structure in which the two pins 16 are disposed so as to be symmetric with respect to the central axis of the lens barrel 10, alignment between the optical axis S1 of the lens barrel 10 and the central axis S2 of the mount ring 20 is easy.

When the position of the already positioned positioning ring 34 is re-adjusted, the fixing screw 36 fastened to the through hole 30 is loosened and alignment is performed again in a manner similar to the above-described method.

The lens mount of the lens device has been described with a bayonet structure as an example, the present invention is not limited thereto; it may be a screw-in type or a spigot type mount.

Moreover, the lens device 1 is not limited to the structure in which the positioning ring 34 of the mount ring 20 is fixed by the fixing screw 36. For example, an adhesive agent may be used instead of the fixing screw 36. In this case, an adhesive agent is filled into the through hole 30 and hardened under a condition where the mount ring 20 is attached to the lens barrel 10, the pin 16 of the attachment surface 12 is fitted in the opening 34a of the positioning ring 34 and the adjustment of the positions of the optical axis of the lens barrel 10 and the central axis of the mount ring 20 is completed. By doing this, the positioning ring 34 can be fixed to the through hole 30 by the adhesive agent.

This description discloses the following matter:

[1] A lens device attached to a camera, the lens device comprising:
 a lens barrel that holds a lens system;
 a mount ring that has a tubular fitted portion which establishes coupling with the camera and a flange portion which is provided around the fitted portion, the mount ring being attached to the lens barrel;
 a plurality of pins that is provided on the lens barrel and positions a central axis of the mount ring with respect to an optical axis of the lens system;
 a plurality of through holes that is formed on the flange portion;
 a positioning ring that has an outer diameter smaller than a hole diameter of the through holes and provided with an opening where the pins are fitted; and
 a fixing member that fixes the positioning ring inside the through holes,
 wherein the pins are restricted by the opening of the positioning ring fixed by the fixing member under a condition where the mount ring is positioned, in order to position the lens barrel and the mount ring with respect to each other.

[2] In the lens device of [1], the fixing member is a screw that is fitted in the through holes to fasten the positioning ring to the mount ring.

[3] In the lens device of [1] or [2], the fixing member is an adhesive agent that is filled in the through holes and hardened to fix the positioning ring to the through holes.

[4] In the lens device of any one of [1] to [3], each of the through holes has a small diameter portion having a hole diameter larger than an outer diameter of the pins and a large diameter portion having a hole diameter larger than the hole diameter of the small diameter portion, and
 the positioning ring is made to abut on a step between the small diameter portion and the large diameter portion to be fixed.

[5] In the lens device of any one of [1] to [4], the plurality of pins is provided symmetrically with respect to a central axis of the lens barrel.

EXPLANATION OF REFERENCE NUMERALS

1 Lens device
10 Lens barrel
16 Pin
20 Mount ring
22 Flange portion
24 Bayonet claw portion
30 Through hole
34 Positioning ring
36 Fixing screw
S1 Optical axis (of the lens barrel)
S2 Central axis (of the mount ring)

What is claimed is:

1. A lens device attached to a camera, the lens device comprising:
 a lens barrel that holds a lens system;
 a mount ring that has a tubular fitted portion which establishes coupling with the camera and a flange portion which is provided around the fitted portion, the mount ring being attached to the lens barrel;
 a plurality of pins that is provided on the lens barrel and positions a central axis of the mount ring with respect to an optical axis of the lens system;
 a plurality of through holes that is formed on the flange portion;
 a positioning ring that has an outer diameter smaller than a hole diameter of the through holes and provided with an opening where the pins are fitted; and
 a fixing member that fixes the positioning ring inside the through holes,
 wherein the pins are restricted by the opening of the positioning ring fixed by the fixing member under a condition where the mount ring is positioned, in order to position the lens barrel and the mount ring with respect to each other.

2. The lens device according to claim 1, wherein the fixing member is a screw that is fitted in the through holes to fasten the positioning ring to the mount ring.

3. The lens device according to claim 1, wherein the fixing member is an adhesive agent that is filled in the through holes and hardened to fix the positioning ring to the through holes.

4. The lens device according to claim 1, wherein each of the through holes has a small diameter portion having a hole diameter larger than an outer diameter of the pins and a large diameter portion having a hole diameter larger than the hole diameter of the small diameter portion, and
 the positioning ring is made to abut on a step between the small diameter portion and the large diameter portion to be fixed.

5. The lens device according to claim 1, wherein the plurality of pins is provided symmetrically with respect to a central axis of the lens barrel.

* * * * *